United States Patent
Beck (10) Patent No.: US 6,196,617 B1
(45) Date of Patent: *Mar. 6, 2001

(54) REAR DOOR STRUCTURE FOR A VEHICLE

(75) Inventor: Gregory S. Beck, Orange County, CA (US)

(73) Assignee: Krystal Koach, Inc., Brea, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,889

(22) Filed: Sep. 30, 1997

(51) Int. Cl.$^7$ .................................................. B60J 5/00
(52) U.S. Cl. .............................. 296/146.11; 296/146.5; 296/202; 296/146.8; 296/16; 16/331; 16/334
(58) Field of Search ................ 296/16, 202, 146.5, 296/146.6, 146.8, 146.11, 146.4; 16/334, 335, 331, 332

(56) References Cited

U.S. PATENT DOCUMENTS

| | | | |
|---|---|---|---|
| 2,148,245 | * 2/1939 | Runkle | 296/16 X |
| 2,208,495 | * 7/1940 | Carlson | 296/16 |
| 2,354,789 | * 4/1944 | Atwood | 16/335 |
| 2,812,536 | * 11/1957 | Ragsdale | 16/332 |
| 3,061,362 | * 10/1962 | Maruyama | 296/146.4 |
| 3,066,349 | * 12/1962 | Youngdale | 16/335 X |
| 3,427,682 | * 2/1969 | Bachmann | 16/335 X |
| 3,558,184 | * 1/1971 | Plegat | 296/146.11 |
| 4,655,499 | * 4/1987 | Piper | 296/146.11 |
| 4,719,665 | * 1/1988 | Bell | 296/146.11 X |
| 4,769,951 | * 9/1988 | Kaaden | 296/146.6 X |
| 4,815,164 | * 3/1989 | Rottinghaus | 296/146.11 X |
| 4,955,659 | * 9/1990 | Kosugi | 296/146.8 |
| 5,306,066 | * 4/1994 | Saathoff | 296/146.6 |
| 5,306,068 | * 4/1994 | Nakae et al. | 296/146.6 X |
| 5,346,272 | * 9/1994 | Priest et al. | 296/146.11 |
| 5,851,050 | * 12/1998 | Squire et al. | 296/146.4 |

FOREIGN PATENT DOCUMENTS

4304922 * 8/1994 (DE) ................... 296/146.11

* cited by examiner

Primary Examiner—Joseph D. Pape
(74) Attorney, Agent, or Firm—John J. Connors; Connors & Associates (57) ABSTRACT

A door structure for a vehicle has a door seated in a door jam frame at the rear end of the vehicle. The door jam fame has a first upright with an opening therein disposed nearby one side of the vehicle to provide a space between this side and the first upright. A second upright is nearby the other side of the vehicle. A hinge member is attached to the door which includes a first connecting member attached to the door member near the one side of the vehicle, a second connecting member pivotally attached to the first upright and disposed in the space between the one side of the vehicle and the first upright, and an intermediate arcuate member connected between the first and second connecting members which extends through the opening in the first upright.

12 Claims, 9 Drawing Sheets

REAR DOOR STRUCTURE FOR A VEHICLE

BACKGROUND OF THE INVENTION

1. Field of the Invention

This invention relates to a door structure for the rear end of a vehicle such as, for example, a hearse.

2. Background Discussion

Some vehicles, in particular hearses, use a rear door that is mounted to be opened to the left or right, rather than being lowered and raised to open and close. It is desirable to provide such a door which is lightweight yet sturdy, and incorporates many of the desirable features of modern vehicles such as automatic closing mechanisms commonly provided on trunks of automotive vehicles. It is also desirable to provide a hinge mechanism which is reliable, easy to install, low cost to manufacture, and which has an attractive appearance. It is the objective of this invention to provide a door structure with these desirable attributes.

SUMMARY OF THE INVENTION

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include low cost, simplified manufacture, reliability, and a streamline hinge appearance.

The first feature of the door structure of this invention is that it is particularly designed to be mounted at an open rear end of a vehicle, such as a hearse, between the opposed sides of the vehicle. It includes a door member, preferably having exterior and interior spaced apart wall members made of a light weight, polymeric material. A honeycomb reinforcing member is positioned between the wall members, and a mounting plate made of metal is secured to the interior wall in a position to be nearby one side of the vehicle when the door member is attached to the open rear end of the vehicle.

The second feature is that the door structure includes a door jam frame at the rear end of the vehicle in which the door member is seated when closed and from which said door member extends when opened. The door jam fame has a first upright disposed nearby the one side of the vehicle to provide a space between this one side of the vehicle and the first upright. A second upright nearby the opposite side of the vehicle. A hinge member is attached to the mounting plate and extends through an opening in the first upright.

The third feature is that the hinge member has a first connecting member attached to the mounting plate, a second connecting member pivotally attached to the first upright and disposed in the space between the one side of the vehicle and the first upright, and an intermediate arcuate member connected between the first and second connecting members which extends through the opening in the first upright. The first connecting member is substantially planar. The second connecting member is also substantially planar and is at an angle in excess of 90 degrees with respect to the second connecting member, preferably from about 120 to about 130 degrees. The intermediate arcuate member has a substantially smooth, continuous, external surface. Such a surface provides an attractive, streamline appearance. Preferably, the arcuate member is a segment of a cylindrical wall. The axis of rotation of the hinge member is the centerline of the cylinder from which the cylindrical wall segment is taken. In other words, the centerline of the segment of the cylindrical wall is coincident with the axis of rotation of the hinge member. The hinge member pivots around this centerline as the door member is opened and closed. There are walls adjacent the hinge member which are covered with a decorative material. These walls are positioned so that only the arcuate member of the hinge is exposed as the door is opened and closed.

The fourth feature is that a mounting member is attached to the door jam frame in a fixed position in the space between the one side of the vehicle and the first upright. This mounting member has a cam surface thereon, with a portion which acts to hold the door member in an open position when engaging a cam follower. The hinge member has a cam follower attached to it. This cam follower, when the door member has been partially opened, engages the cam surface, and, when the door member has been opened to a predetermined maximum open position, it engages the stop to hold the door member in the predetermined maximum open position.

The fifth feature is a latch mechanism attached to the door member. The exterior wall member has a handle member therein near the opposite side of the vehicle which, when activated, engages and disengages the latch mechanism. A striker mechanism is provided having a motor which pulls the door into the door jam frame when the latch mechanism initially contacts the striker mechanism.

BRIEF DESCRIPTION OF THE DRAWING

The preferred embodiment of this invention, illustrating all its features, will now be discussed in detail. This embodiment depicts the novel and non-obvious door structure of this invention as shown in the accompanying drawing, which is for illustrative purposes only. This drawing includes the following figures (FIGS.), with like numerals indicating like parts:

FIG. 2a is a rear elevational view of the hearse shown in FIG. 1a.

FIG. 2b is an enlarged, fragmentary view of the rear end of the hearse shown in FIG. 2a.

DETAILED DESCRIPTION OF THE PREFERRED EMBODIMENT

Figure 1A:
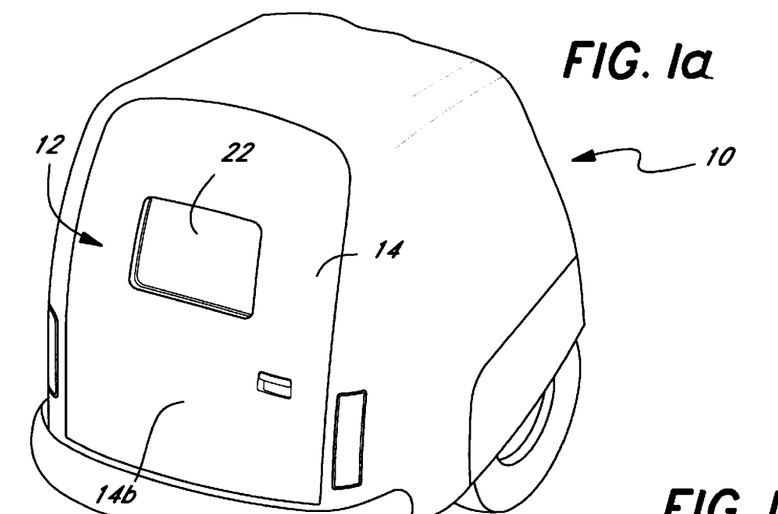
FIG. 1a is a perspective view of the rear end of a hearse showing the door structure of this invention hingedly mounted to the left side of hearse.
Figure 1B:
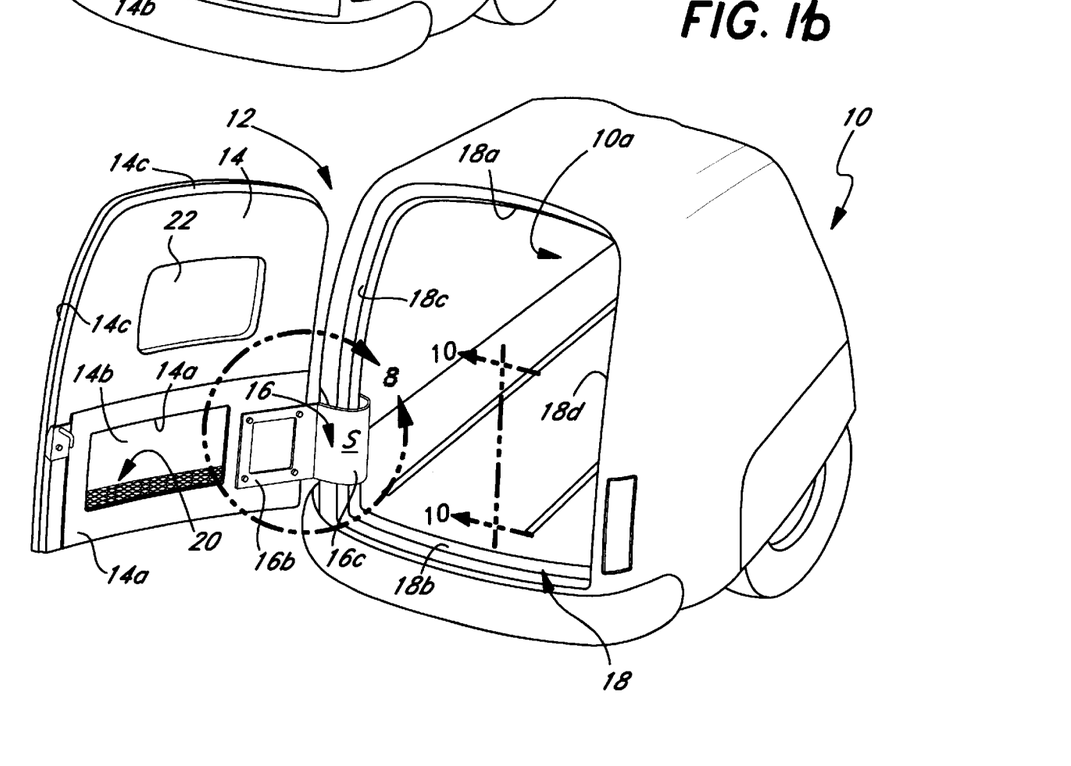
FIG. 1b is a perspective view of the hearse shown in FIG. 1a with the door structure open completely opened.
Figures 2A, 2B:
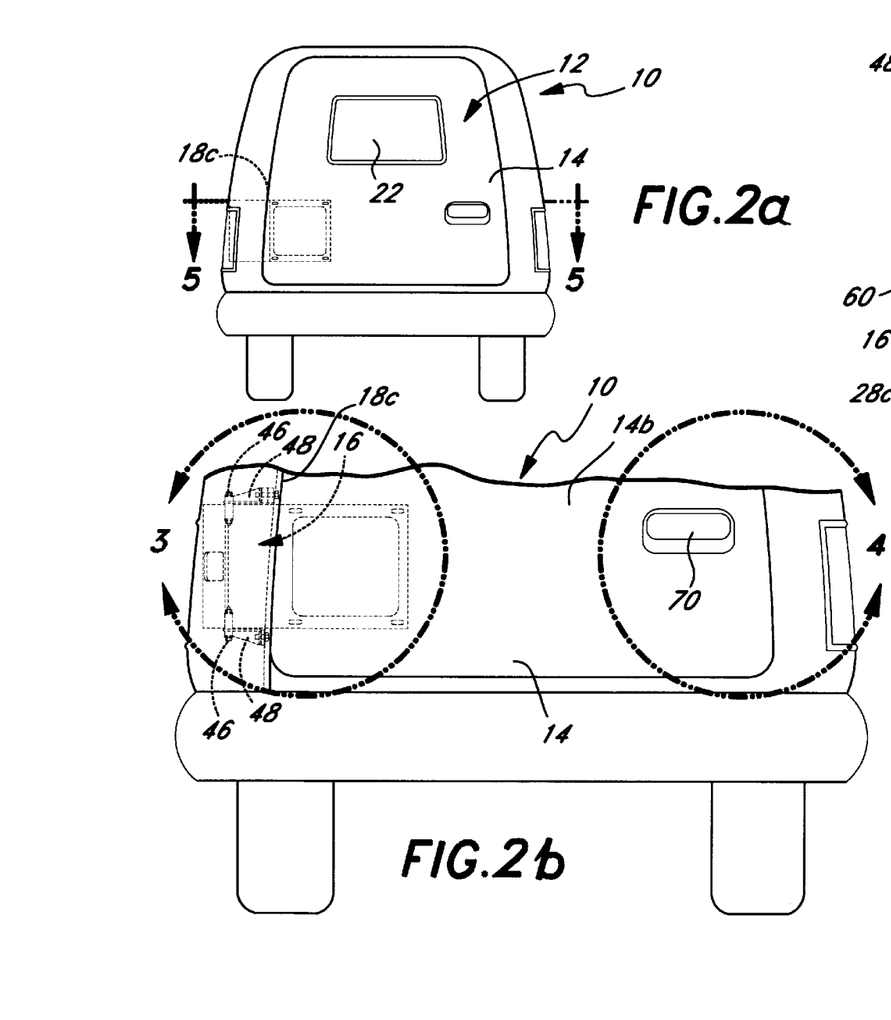
Figure 3:
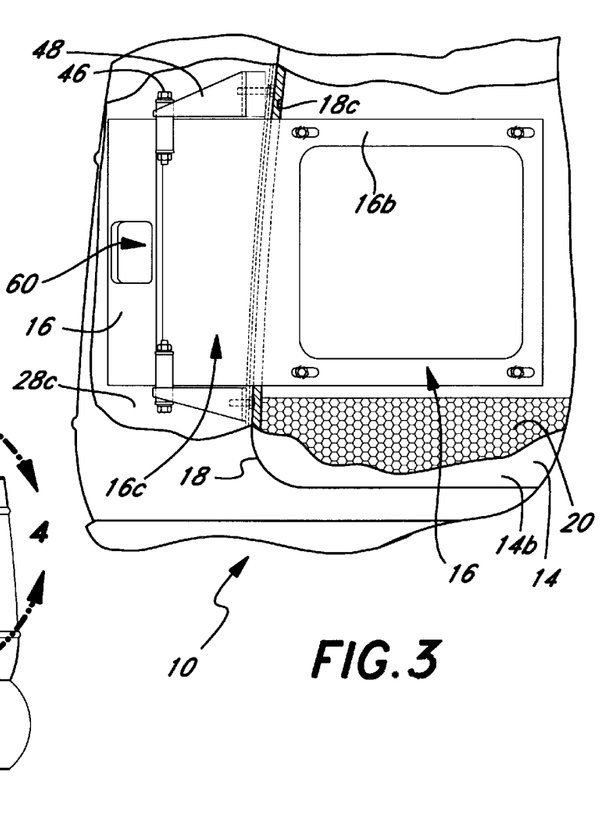
FIG. 3 is an enlarged, fragmentary view, with sections broken away, showing a hinge attached to a mounting plate on the rear door.
Figure 4A:
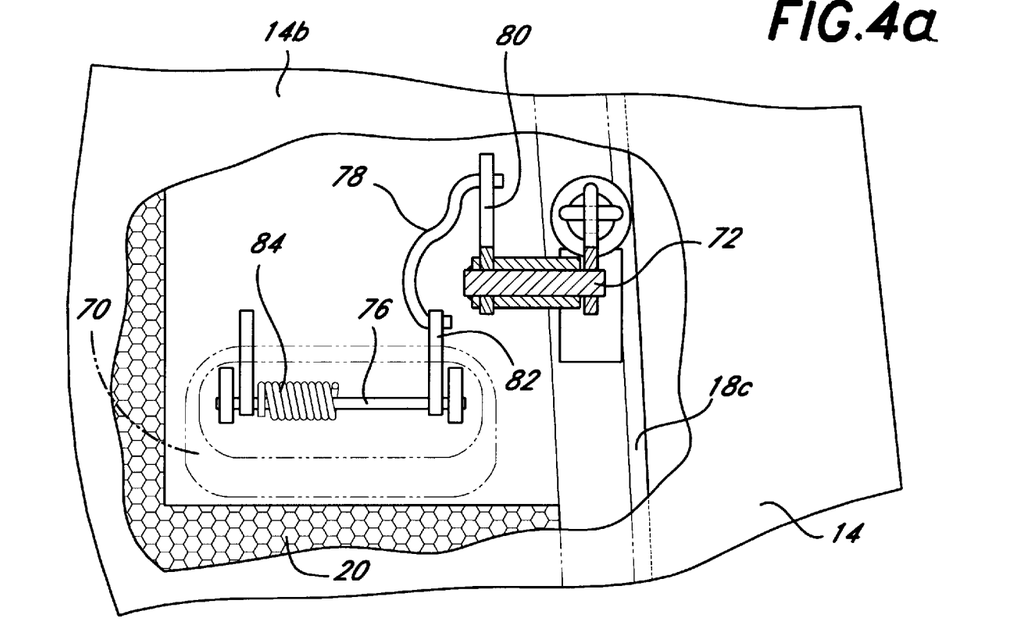
FIG. 4a is a hearse, elevational view, with sections broken away, showing a handle in the rear door operatively attached to a latch mechanism.
Figure 4B:
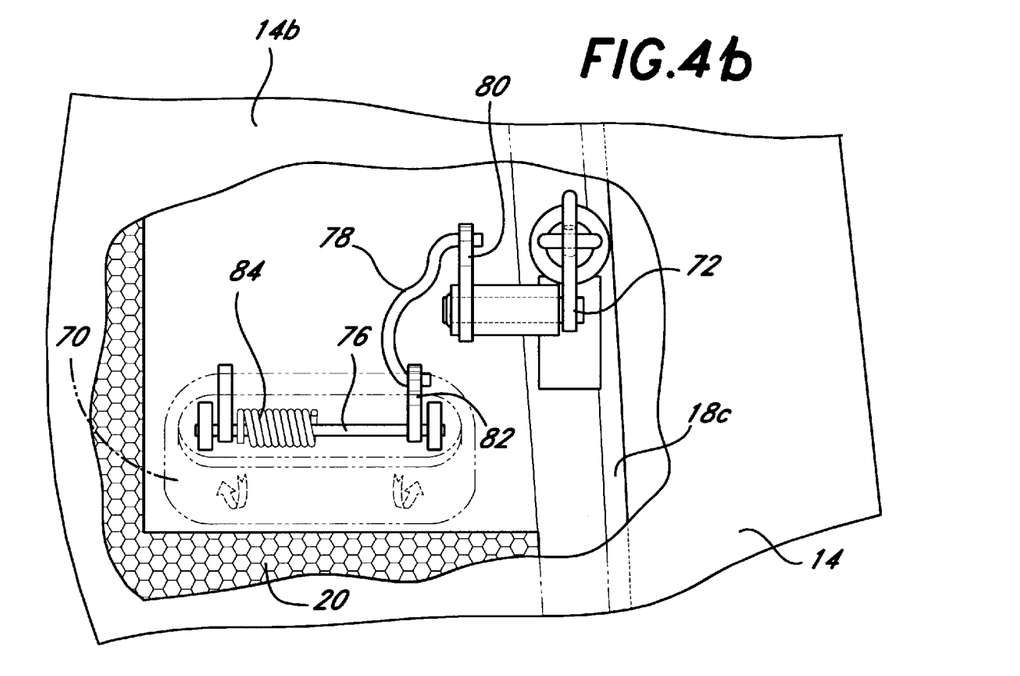
FIG. 4b is a view similar to that shown in FIG. 4a showing the handle moved to a position which disengages the latch mechanism.

As illustrated in FIGS. 1a and 1b, a hearse 10 is equipped with the door structure 12 of this invention, which includes a door 14 mounted by a hinge 16 to the left side of the hearse so that the door can swing to towards the left side of the hearse upon being opened. When closed, the door 14 fits snugly within a door jam frame 18 located in the open rear 10a of the hearse 10, as illustrated in FIG. 1a. The door 14 optionally could be mounted to the right side of the hearse 10 so that it would swing to the right upon being opened.

As shown in FIG. 1b, 3, and 5 through 7, the door 14 includes an interior wall 14a and an exterior wall 14b, preferably made of a lightweight, durable, composite material, such as a polymeric material like fiberglass. A honeycomb reinforcing member 20 is disposed between the interior and exterior walls 14a and 14b to provide structural rigidity to the door 14. There may be openings in the door 14 such as a window 22 (FIGS. 1a and 1b), and the entire area between the interior and exterior walls need not be filled completely with the honeycomb reinforcing member 20. A marginal end wall 14c surrounds the honeycomb reinforcing member 20, providing an enclosure for the honeycomb reinforcing structure. A generally square shaped, metal mounting plate 24 is imbedded inside the door 14, forming a part of the interior wall 14a. An epoxy resin adhesive may be used to secure this metal mounting plate 24 in position adjacent the left side of the hearse 10, to which the door 14 is connected.

Figure 5:
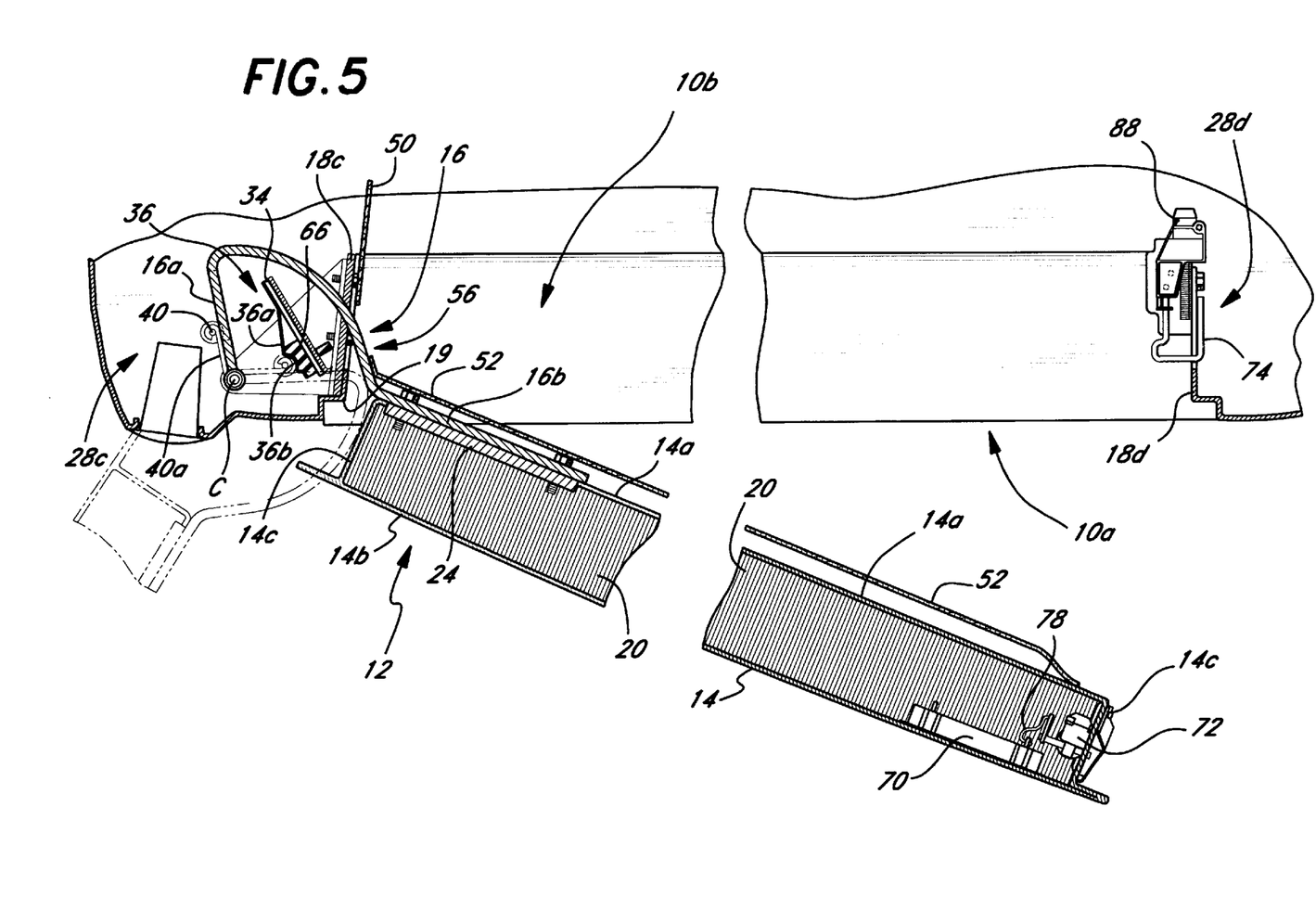
FIG. 5 is a cross-sectional view taken along line 5—5 of FIG. 2a showing the rear door in a partially opened position.
Figure 6:
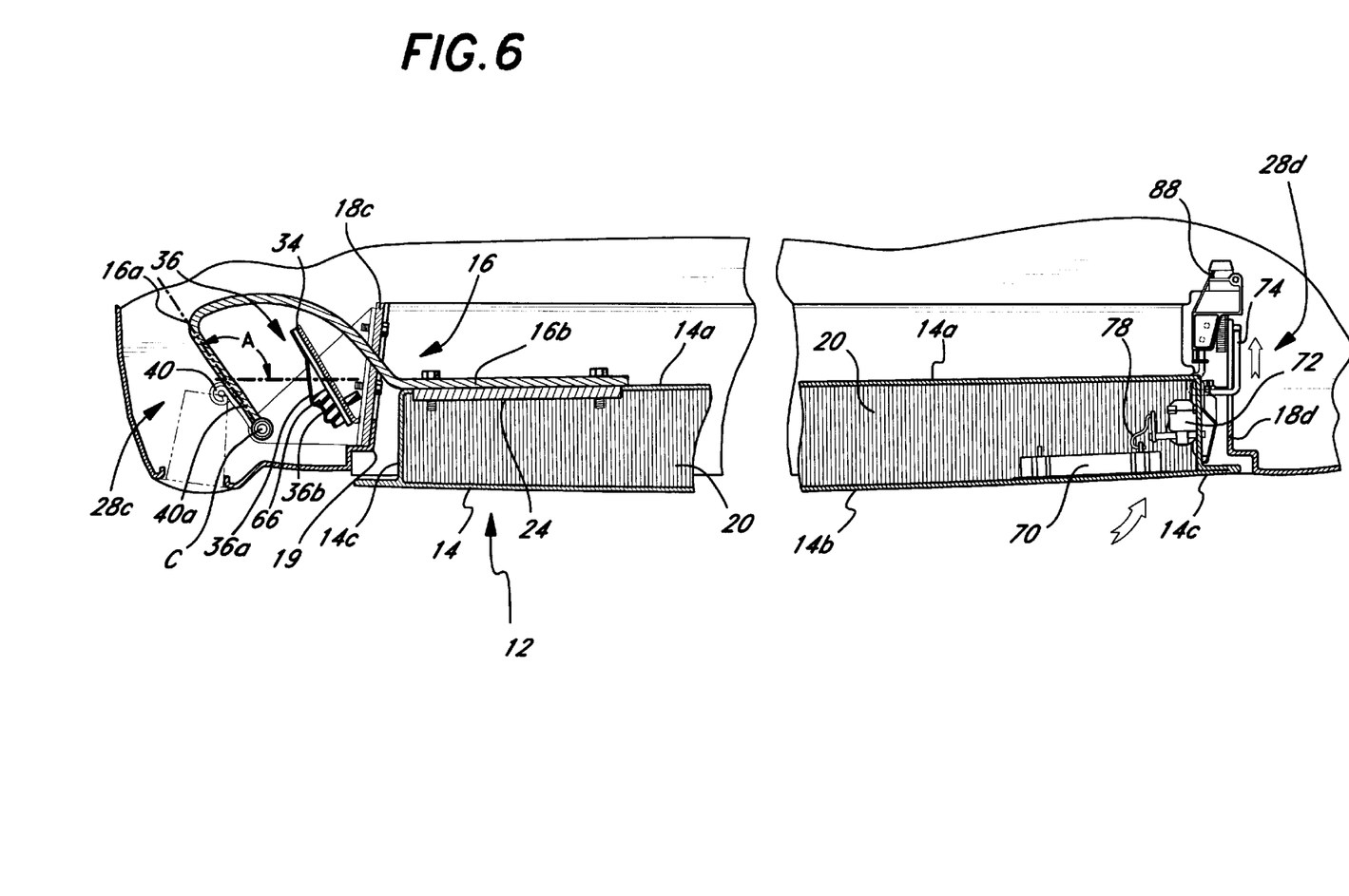
FIG. 6 is a cross-sectional view similar to that shown in FIG. 5 with the door being closed.
Figure 7:
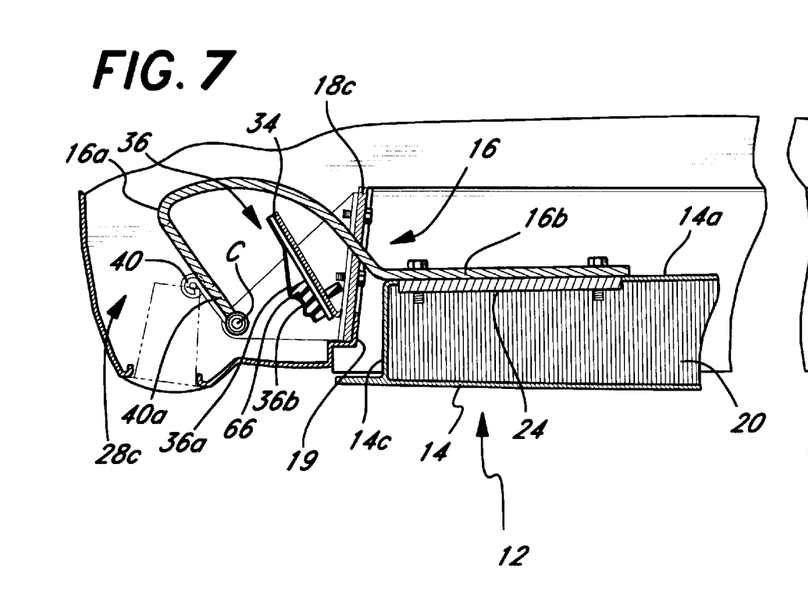
FIG. 7 is a cross-sectional view similar to that shown in FIG. 6 with the handle in the rear door lifted and the latch mechanism being disengaged to open the door.

The door jamb frame 18 has a top 18a and a bottom 18b, and opposed left and right uprights 18c and 18d, respectively. Both the left and right uprights 18c and 18d are spaced inwardly from the sides of the hearse 10 to provide, respectively, the spaces 28c and 28d. As best illustrated in FIGS. 5 through 7, the space 28c is between the left side of the hearse 10 and the upright 18c and the space 28d is between the right side of the hearse 10 and the upright 18d. The left upright 18c is covered with a decorative cover 19.

Figure 9:
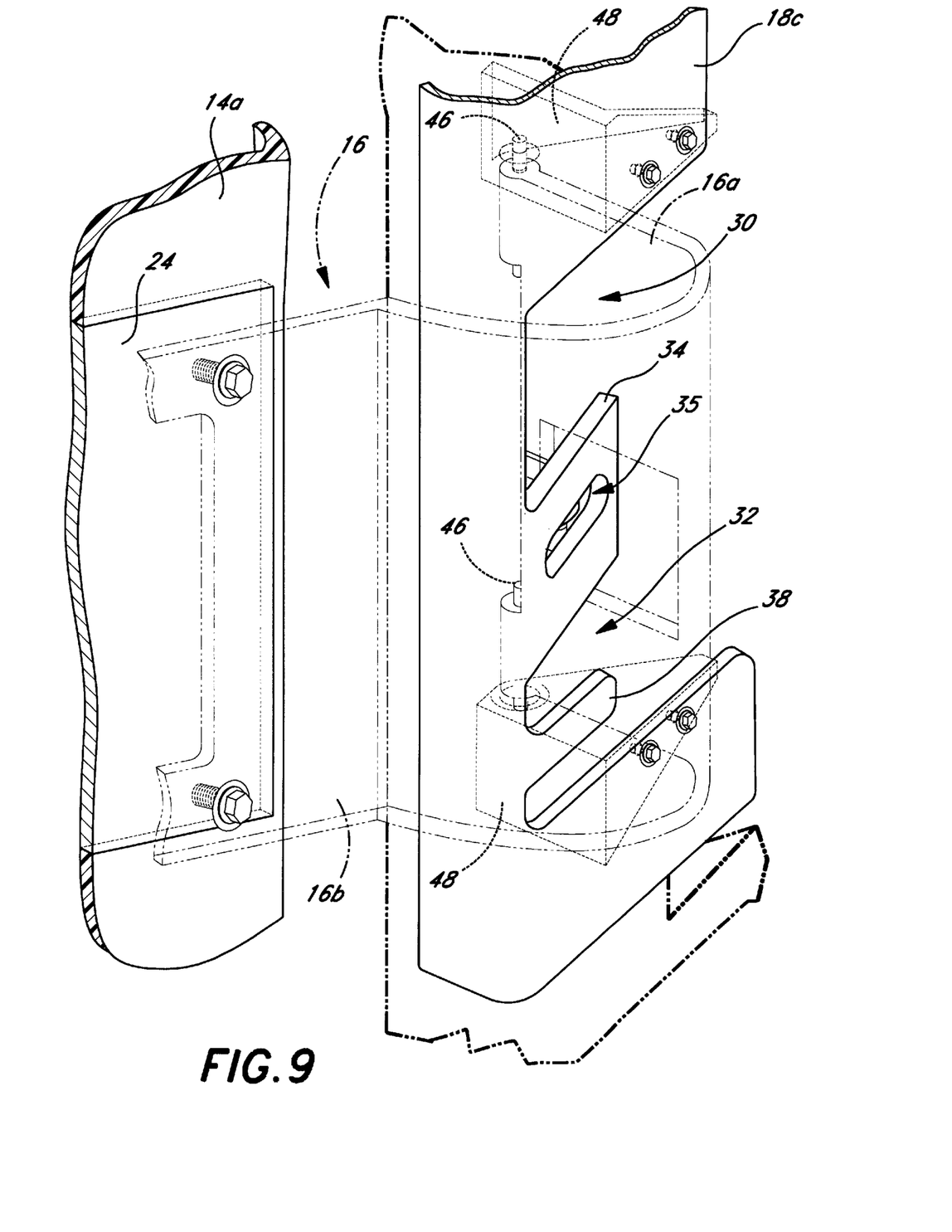
FIG. 9 is a perspective view with the hinge shown in phantom, illustrating the cam wheel engaging the cam surface of the door holding mechanism employed in this invention.
Figure 10:
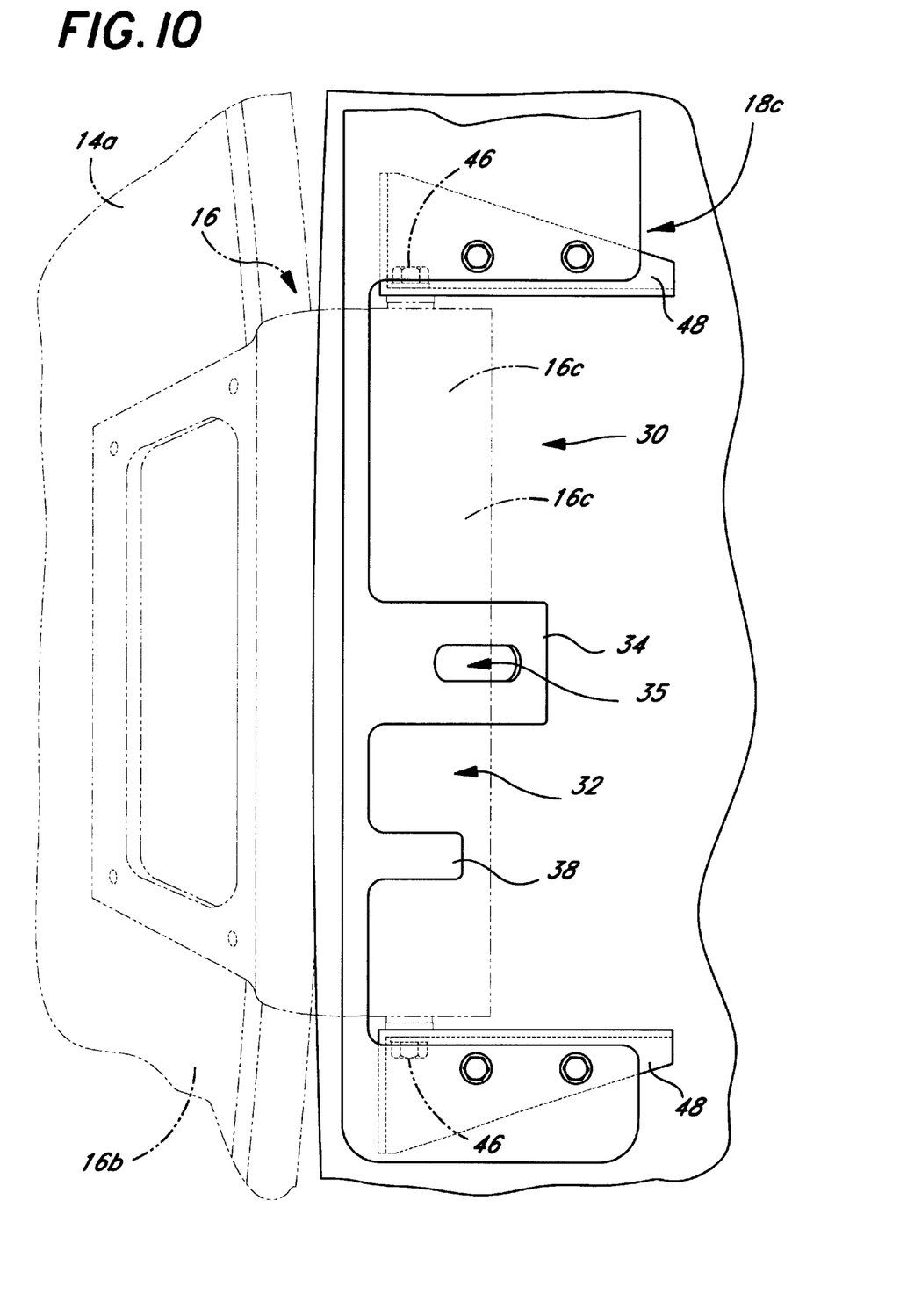
FIG. 10 is an end elevational view of the upright adjacent the left side of the vehicle, with the door member attached to this upright in the fully open position.

As best shown in FIGS. 9 and 10, the left upright 18c to which the hinge 16 is attached has cutaway sections that provide openings 30 and 32 that allow the hinge 16 to move through these openings as the door 14 is opened and closed. An extension section between these openings 30 and 32 provides a mounting plate 34 for a cam mechanism 36 which is attached to this plate as illustrated in FIGS. 5 through 7. A cam wheel 40 mounted on a bracket 40a carried by the hinge 16 engages the cam mechanism 36 as the door is closed as discussed subsequently in greater detail. The mounting plate 34 is bend inward towards the left side of the hearse 10, so that it is disposed in the space 28c. A stop 38 is formed in this upright 18c in its lower portion. This stop 38 engages the hinge 16 member when the door 14 is in its maximum open position, as shown in FIG. 1a and in dotted lines in FIGS. 5 and 10.

Figure 8:
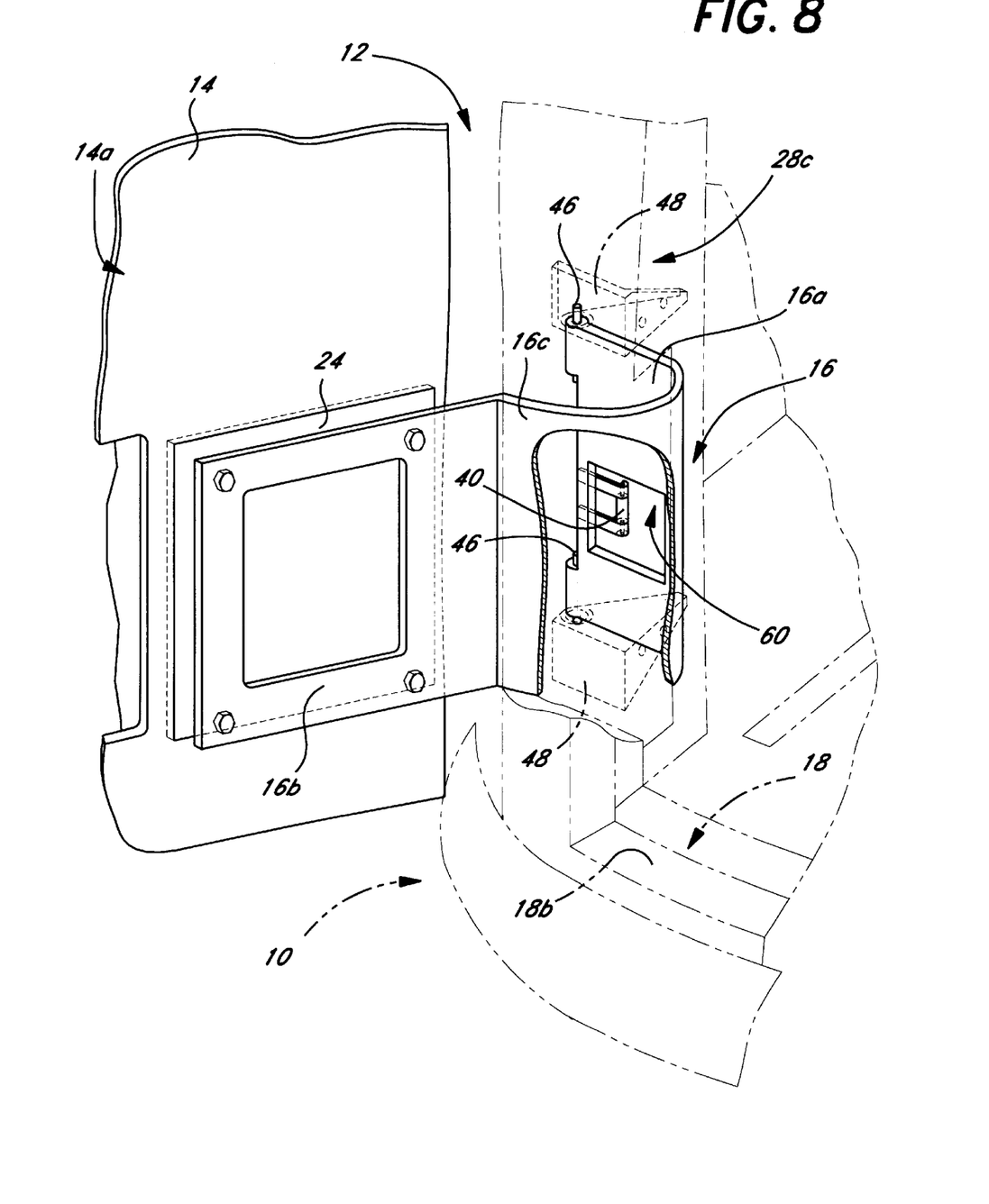
FIG. 8 is a perspective view showing the door in a partially opened position, illustrating the manner in which the hinge is attached to the interior wall of the door member.

As best depicted in FIGS. 8 and 9, the hinge 16 is a unitary, piece of metal, preferably steel, having a generally flat planar connecting member 16a attached by hinge pins 46 inserted into triangular shaped mounting brackets 48 secured by bolts to the left upright 18c on the inside of this upright in the space 28c, respectively at the top and bottom of this upright. A second, generally flat planar connecting plate 16b is bolted to the mounting plate 24. The two connecting plates 16a and 16b are disposed relative to each other at an angle A greater than 90 degrees, preferably at an angle of 125 degrees. These two connecting plates 16a and 16b merge with an arcuate member 16c of the hinge 16. This arcuate member 16c has a solid, smooth, continuous, exposed surface S that has an attractive appearance when the door 14 is opened, as illustrated in FIG. 1b. This arcuate member 16c is a segment of a cylindrical wall where the centerline C of the cylinder is coincident with the axis of rotation of the hinge 16. As illustrated in FIG. 5, the walls 50 and 52 of the rear loading section 10b of the hearse 10 are adjacent this arcuate member 16c. The wall 50 is attached to the left inside of the rear loading section 10b, and the wall 52 is attached to the interior wall 14a of the door 14, and moves with the door. These walls 50 and 52 are covered with a decorative material and spaced apart to provide a relatively narrow gap 56, which increases and decreases in width as the door 14 is opened and closed. Regardless of the position of the door 14, the gap is nevertheless restricted in width, so that only the smooth, continuous, surface S is exposed to view.

Figure 7A:
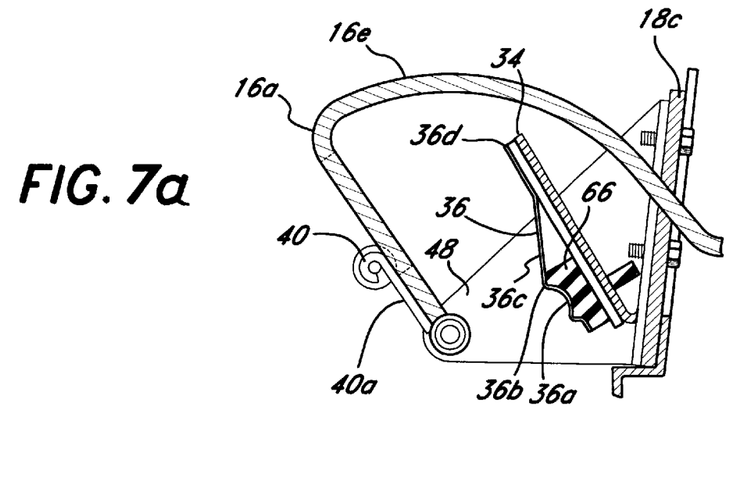
FIG. 7a is an enlarged cross-sectional showing the cam mechanism and cam wheel.

As best shown in FIG. 8, the connecting member 16a has centrally located therein an enlarged, square opening 60. The bracket 40a for cam wheel 40 is attached to this connecting member 16a and the cam wheel is positioned at the square opening 60 so that, when the door 14 is partially opened, this cam wheel will engage the cam mechanism 36. As best shown in FIG. 7a, the cam mechanism 36 includes a cam surface 36a over which the wheel 40 rides until it comes to an indentation 36b. The cam surface 36a is the exterior of a leaf spring that has a ramp 36c attached at one end to a bracket 36d which is bolted by bolts (not shown) passing through a slot 35 in the mounting plate 34. The ramp 36c leads to the indentation 36b. A rubber block 66 is disposed between the bracket 36d and the underside of the indentation 36b. Thus, when the cam wheel 40 rides up the ramp 36c and drops into the indentation 36b, it will remain in this position, holding the door 14 in its maximum opened position until the door is manually closed.

As best shown in FIGS. 4a and 4b and 5 through 7, there is a handle 70 in the exterior wall of the door 14 which, upon being lifted upward open the door 14 by disengaging a conventional latch mechanism 72 from a motor driven striker 74, enabling the door 14 to be opened. This handle 70 is attached to a rod 76 mounted at its ends so that it may rotate. A bent connecting member 78 mechanically couples this rod 76 to the latch mechanism 72, with one end of the bent connecting member attached by a bar 80 to the latch mechanism, and the other end of this bent connecting member attached by another bar 82 to the rod 76. Because of this mechanically coupling, lifting the handle 70 as shown in FIG. 7 disengages the latching mechanism 72 from the striker 74, enabling the door 14 to be opened. A spring 84 coiled around the rod 76 returns the handle 70 to its normally closed position, as shown in FIG. 6. When the door 14 is closed, as soon as the latching mechanism 72 engages the striker 74, a motor 88 is activated to pull the door 14 completely and automatically within the door jam frame 18. Such latching mechanisms 72 and striker 74 are commonly employed in trunks of automotive vehicles, but are not ordinarily used on a door 14 which require a handle that is manually manipulated.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

What is claimed is:

1. In combination with a vehicle having a first side, a second side, and an open rear end,
    a door member having exterior and interior spaced apart wall members made of a light weight, polymeric material,
    a honeycomb reinforcing member positioned between the wall members,
    a mounting plate made of metal secured to the interior wall in a position to be nearby the first side of the vehicle when the door member is attached to the open rear end of the vehicle,
    a door jam frame at the rear end of the vehicle in which the door member is seated when closed and from which said door member extends when opened,
    said door jam frame having a first upright disposed nearby said first side of the vehicle to provide a space between said first side of the vehicle and the first upright and a second upright nearby the second side of the vehicle, said first upright having (a) a pair of spaced apart cutaway sections providing a pair of spaced apart openings therein, (b) a mounting member disposed between said pair of openings in a fixed position in the space between said first side of the vehicle and the first upright, and (c) a stop that limits the door member to a predetermined maximum open position, said mounting member having a cam surface thereon facing the first side of the vehicle,
    a hinge member attached to the mounting plate and having
    a substantially planar first connecting member attached to the mounting plate,
    a substantially planar second connecting member pivotally attached to the first upright and disposed in the space between said first side of the vehicle and the first upright, said second connecting member being at an angle in excess of 90 degrees with respect to the first connecting member and having an opening therein and an exterior surface to which a cam follower is attached, said cam follower, when the door member is closed, facing towards the first side of the vehicle and, when the door member is in said predetermined maximum open position, facing and engaging the cam surface, a portion of the cam surface acting to hold the door member in an open position when engaging the cam follower,
    and an intermediate arcuate member connected between the first and second connecting members which partially surrounds said first upright, said intermediate arcuate member having a substantially smooth, continuous, external surface and being a segment of a cylindrical wall,
    when said door member has been opened, said mounting member extending through the opening in the second connecting member and portions of the second connecting member extending through the pair of opening in the first upright.

2. The combination of claim 1 where the angle of the second connecting member with respect to the first connecting member is from 120 to 130 degrees.

3. The combination of claim 1 including a latch mechanism attached to the door member, and the exterior wall member has a handle member therein near the second side of the vehicle which, when activated, engages and disengages the latch mechanism.

4. The combination of claim 3 including a striker mechanism having a motor which pulls the door into the door jam frame when the latch mechanism initially contacts the striker mechanism.

5. In combination with a vehicle having a first side, a second side, and an open rear end,
    a door member and a door jam frame at the rear end of the vehicle in which the door member is seated when closed and from which said door member extends when opened,
    said door jam frame having a first upright disposed nearby said first side of the vehicle to provide a space between said first side of the vehicle and the first upright and a second upright nearby the second side of the vehicle, said first upright having (a) a pair of spaced apart cutaway sections providing a pair of spaced apart openings therein, (b) a mounting member disposed between said pair of openings in a fixed position in the space between said first side of the vehicle and the first upright, and (c) a stop that limits the door member to a predetermined maximum open position, said mounting member having a cam surface thereon facing the first side of the vehicle,
    a hinge member attached to the door member and having
    a substantially planar first connecting member attached to the door member at a portion of the door member which is nearby the first side of said vehicle,
    a substantially planar second connecting member pivotally attached to the first upright and disposed in the space between said first side of the vehicle and the first upright, said second connecting member having an opening therein and an exterior surface to which a cam follower is attached, said cam follower, when the door member is closed, facing towards the first side of the vehicle and, when the door member is in said predetermined maximum open position, facing and engaging the cam surface, a portion of the cam surface acting to hold the door member in an open position when engaging the cam follower,
    and an intermediate arcuate member connected between the first and second connecting members which partially surrounds said first upright, said intermediate arcuate member having a substantially smooth, continuous, external surface which is a wall segment of a cylinder having a centerline,
    said hinge member having an axis of rotation which is coincident with said centerline, so that the hinge member pivots around said centerline as the door member is opened and closed,
    when said door member has been opened, said mounting member extending through the opening in the second connecting member and portions of the second connecting member extending through the pair of opening in the first upright.

6. The combination of claim 5 where the first connecting member is substantially planar.

7. The combination of claim 6 where the second connecting member is substantially planar and is at an angle in excess of 90 degrees with respect to the first connecting member.

8. The combination of claim 7 where the angle of the second connecting member with respect to the first connecting member is from 120 to 130 degrees.

9. The combination of claim 5 including interior walls within the vehicle adjacent the hinge that are covered with a decorative material, with only the arcuate member of the hinge being exposed as the door is opened and closed.

10. In combination with a vehicle having a side and an open rear end, a door member and a door jam frame at the rear end of the vehicle in which the door member is seated when closed and from which said door member extends when opened, said door jam frame having an upright disposed nearby said side of the vehicle to provide a space between said side of the vehicle and the upright, said upright having a mounting member disposed in a fixed position in the space between said side of the vehicle and the upright, said mounting member having a cam surface thereon facing the side of the vehicle, a hinge member attached to the door member and having a substantially planar first connecting member attached to the door member at a portion of the door member which is nearby the side of said vehicle, a substantially planar second connecting member pivotally attached to the upright and disposed in the space between said side of the vehicle and the upright, said second connecting member having an opening therein and an exterior surface to which a cam follower is attached, said cam follower, when the door member is closed, facing towards the side of the vehicle and, when the door member is in an open position, facing and engaging the cam surface, a portion of the cam surface acting to hold the door member in the open position when engaging the cam follower, and an intermediate arcuate member connected between the first and second connecting members which partially surrounds said upright, said intermediate arcuate member having a substantially smooth, continuous, external surface which is a wall segment of a cylinder having a centerline, said hinge member having an axis of rotation which is coincident with said centerline, so that the hinge member pivots around said centerline as the door member is opened and closed, when said door member has been opened, said mounting member extending through the opening in the second connecting member.

11. The combination of claim 10 wherein the upright includes a stop that limits the door member to a predetermined maximum open position.

12. The combination of claim 10 wherein the angle of the second connecting member with respect to the first connecting member being from 120 to 130 degrees.

* * * * *